United States Patent
Klimek et al.

(10) Patent No.: US 8,317,227 B2
(45) Date of Patent: Nov. 27, 2012

(54) CAR BODY FOR A MOTOR VEHICLE

(75) Inventors: Stanislaw Klimek, Frankfurt (DE); Martin Schwarz, Stadecken-Elsheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 95 days.

(21) Appl. No.: 12/960,226

(22) Filed: Dec. 3, 2010

(65) Prior Publication Data

US 2011/0148089 A1  Jun. 23, 2011

(30) Foreign Application Priority Data

Dec. 3, 2009  (DE) .......................... 10 2009 056 851

(51) Int. Cl.
- *B62D 21/02* (2006.01)
- *B62D 24/00* (2006.01)
- *B60K 15/03* (2006.01)
- *B60R 16/04* (2006.01)

(52) U.S. Cl. ....... 280/781; 180/68.5; 180/69.4; 280/834

(58) Field of Classification Search ................ 180/68.5, 180/69.4, 69.5, 69.6, 311, 312; 280/781, 280/783, 797, 798, 799, 800, 830, 834; 296/193.07, 296/203.01, 203.04, 204, 193.08

See application file for complete search history.

(56) References Cited

U.S. PATENT DOCUMENTS

| | | | |
|---|---|---|---|
| 3,292,944 A * | 12/1966 | Dangauthier | .......... 280/124.107 |
| 3,638,748 A | 2/1972 | Tixier | |
| 3,811,698 A | 5/1974 | Glance | |
| 4,058,182 A | 11/1977 | Huber | |
| 4,216,839 A | 8/1980 | Gould et al. | |
| 4,733,813 A | 3/1988 | Le Meau et al. | |
| 5,174,628 A | 12/1992 | Hayatsugu et al. | |
| 5,364,128 A * | 11/1994 | Ide | ................ 280/784 |
| 5,507,522 A * | 4/1996 | Ritchie | ........................ 280/800 |
| 5,641,031 A * | 6/1997 | Riemer et al. | ................ 429/423 |
| 6,766,873 B2 * | 7/2004 | Chernoff et al. | ............. 180/65.1 |
| 6,824,168 B2 | 11/2004 | Kawazu et al. | |
| 6,948,226 B2 * | 9/2005 | Chernoff et al. | ................ 29/428 |
| 7,370,886 B2 | 5/2008 | Luttinen et al. | |

(Continued)

FOREIGN PATENT DOCUMENTS

DE  2313588 A1  10/1973

(Continued)

OTHER PUBLICATIONS

Top500-Lexicon, available at http://www.top500.de/lexikon/electric_accumulators.htm (last visited May 2, 2012).*

(Continued)

*Primary Examiner* — Joseph Rocca

(74) *Attorney, Agent, or Firm* — Ingrassia Fisher & Lorenz, P.C.

(57) ABSTRACT

A car body is provided for a motor vehicle that includes, but is not limited to a structural unit including a rear frame structure with a rear axle and mountings for a fuel tank or an electric accumulator. The structural unit is fixed on a bottom plate of the car body. A correspondingly designed rear frame structure makes it possible to selectively equip the motor vehicle for drives with an internal combustion or purely electric drives or hybrid drives.

20 Claims, 2 Drawing Sheets

U.S. PATENT DOCUMENTS

| | | |
|---|---|---|
| 2003/0040827 A1* | 2/2003 | Chernoff et al. .............. 700/117 |
| 2003/0189334 A1 | 10/2003 | Kawasaki et al. |
| 2006/0121795 A1* | 6/2006 | Hashimura et al. ........... 439/681 |
| 2006/0197300 A1 | 9/2006 | Nakashima et al. |
| 2006/0289224 A1* | 12/2006 | Ono et al. .................... 180/311 |
| 2009/0058142 A1 | 3/2009 | Park |
| 2010/0127520 A1 | 5/2010 | Ginja et al. |
| 2010/0244481 A1 | 9/2010 | Ohno et al. |

FOREIGN PATENT DOCUMENTS

| | | |
|---|---|---|
| DE | 2522844 C3 | 1/1979 |
| DE | 4234143 A1 | 4/1994 |
| DE | 19538456 A1 | 4/1997 |
| DE | 10239500 A1 | 9/2003 |
| EP | 0333267 A1 | 9/1989 |
| FR | 2840573 A1 | 12/2003 |
| FR | 2927033 A1 | 8/2009 |
| GB | 1313408 A | 4/1973 |
| JP | 62174935 A | 7/1987 |
| JP | 2004168237 A | 6/2004 |
| JP | 2005170076 A | 6/2005 |
| WO | 2005049383 A1 | 6/2005 |
| WO | 2008110709 A2 | 9/2008 |
| WO | 2008152257 A1 | 12/2008 |

OTHER PUBLICATIONS

"Bonded" Definition, Dictionary.Com, available at http://dictionary.reference.com/browse/bonded?r=66 (last visited May 2, 2012).*

German Patent Office, German Search Report for Country Application No. 102009056851.4, Nov. 22, 2010.

British Patent Office, British Search Report for British Application No. 1020342.0, Mar. 17, 2011.

British Patent Office, British Search Report for British Application No. 1020385.9, Mar. 18, 2011.

* cited by examiner

CAR BODY FOR A MOTOR VEHICLE

CROSS-REFERENCE TO RELATED APPLICATION

This application claims priority to German Patent Application No. 102009056851.4, filed Dec. 3, 2009, which is incorporated herein by reference in its entirety.

TECHNICAL FIELD

The technical field pertains to a car body for a motor vehicle with a bottom plate and a rear frame structure that is fixed on the bottom plate, and with a rear axle.

BACKGROUND

Various embodiments of such car bodies for modern motor vehicles are known from practical applications. In car bodies of this type, the rear frame structure frequently is initially manufactured together with the bottom plate. Subsequently, the rear axle, struts and the like are mounted on the rear frame structure. Furthermore, subframes that carry individual components of the motor vehicle and are connected to the car body are also known from practical applications.

In such car bodies known from practical applications, however, one disadvantage can be seen in that it is very difficult to adapt these car bodies to different types of motor vehicles. For example, different brake systems or drive concepts for the rear axle require different structural spaces. These different requirements therefore make it necessary to provide specially adapted car bodies.

In view of the foregoing, it would be desirable to develop a car body of the initially cited type in such a way that it can be adapted to different vehicle types in the simplest possible fashion. In addition, other desirable features and characteristics will become apparent from the subsequent detailed description, and the appended claims, taken in conjunction with the accompanying drawings and this background.

SUMMARY

According to an embodiment of the invention, this problem is solved in that the rear frame structure supports the rear axle and extends from the rear end of the car body over the bottom plate and is fixed thereon, and in that a mounting for an electric accumulator and/or a fuel tank is arranged on the rear frame structure. Due to this design, the bottom plate can be uniformly manufactured in the same fashion for all vehicle types. The rear frame structure can be easily adapted to different vehicle types.

The electric accumulator may selectively consist of a storage battery for an internal combustion engine or of an accumulator for an electric drive of the motor vehicle. A correspondingly adapted rear frame structure makes it possible to equip the real axle with a wheel hub motor such that the inventive car body can be selectively adapted to a drive with an internal combustion engine, an electric drive or a hybrid drive.

The inventive car body has a particularly high stability if the rear frame structure supports a rear bumper of the motor vehicle. The inventive car body allows a high integration density of components into the rear frame structure if the rear frame structure carries spring/damping units for supporting the rear wheels. This simplifies the assembly of the inventive car body.

The assembly of the inventive car body is particularly simple if the rear frame structure, the rear axle, the fuel tank and/or the electric accumulator form a structural unit that can be preassembled. Another advantage of this design can be seen in that the preassembled unit can be easily tested with respect to its function. This functional test is particularly advantageous for electric or partially electric drives of a motor vehicle. The spring/damping units preferably also form part of the structural unit that can be preassembled.

According to another advantageous embodiment of the invention, a uniform introduction of forces from the rear frame structure over the entire width of the bottom plate can be achieved with simple means if longitudinal beams of the rear frame structure respectively divide into outer and inner longitudinal beams of the bottom plate.

According to another embodiment of the invention, the structural unit that can be preassembled and features the rear frame structure has a high inherent stability if the rear frame structure features a crossbeam that is arranged transverse to the driving direction between the rear axle and the mounting for the fuel tank and/or the electric accumulator. Another advantage of this design can be seen in that the fuel tank and/or the electric accumulator is very reliably protected from damages if the motor vehicle is involved in a crash.

Conventional car bodies usually are entirely manufactured of sheet steel. In order to achieve a particularly high stability and a low weight of the inventive car body, however, it is preferred to manufacture the bottom plate and the rear frame structure of different materials.

According to another embodiment of the invention, the rear frame structure has a particularly low weight and can be very cost-effectively manufactured if the rear frame structure consists of light metal or composite material. In order to simplify the assembly of the inventive car body, it is advantageous to bond the rear frame structure to the bottom plate.

BRIEF DESCRIPTION OF THE DRAWINGS

The present invention will hereinafter be described in conjunction with the following drawing figures, wherein like numerals denote like elements, and FIG. 1 schematically shows a motor vehicle with a car body according to an embodiment of the invention.

DETAILED DESCRIPTION

The following detailed description is merely exemplary in nature and is not intended to limit application and uses Furthermore, there is no intention to be bound by any theory presented in the preceding background or summary or the following detailed description.

Figure 1:
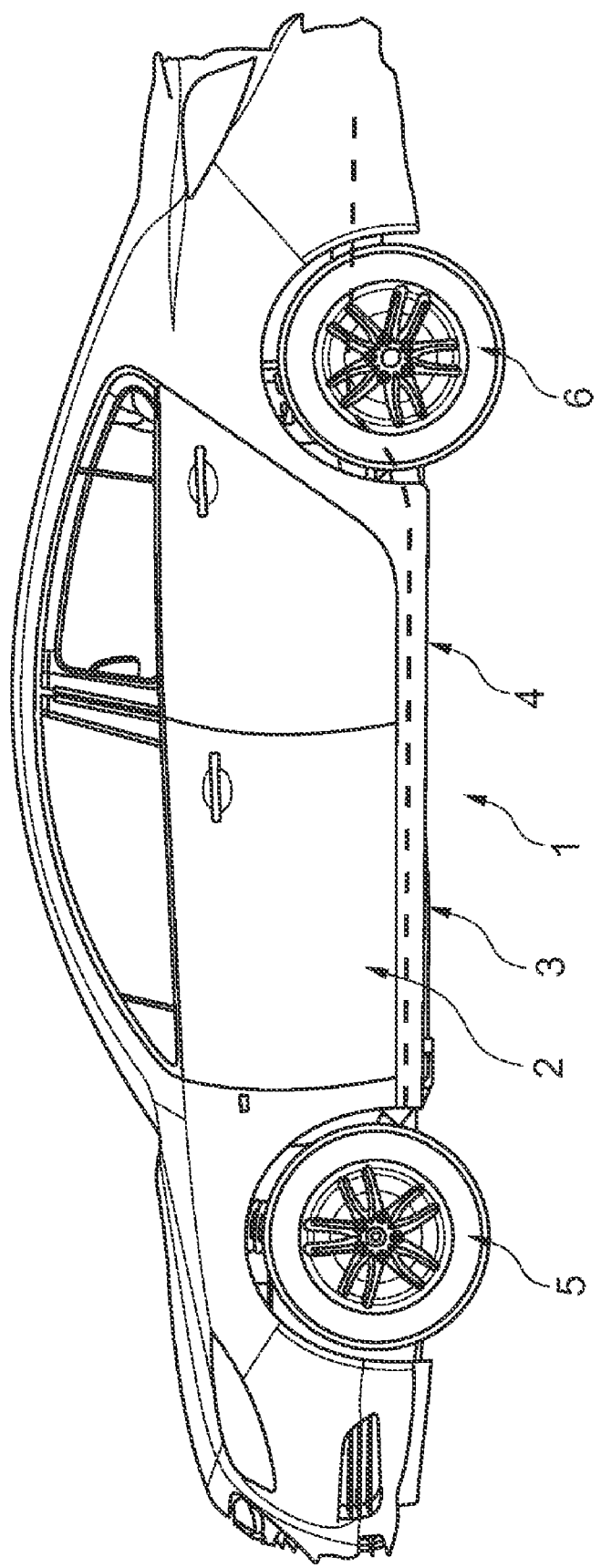

FIG. 1 shows a motor vehicle with a car body 1 and a passenger compartment 2. The car body 1 features a bottom plate 3 that forms the lower end of the passenger compartment 2 and a rear frame structure 4. Front wheels 5 and rear wheels 6 are mounted on the car body 1.

Figure 2:
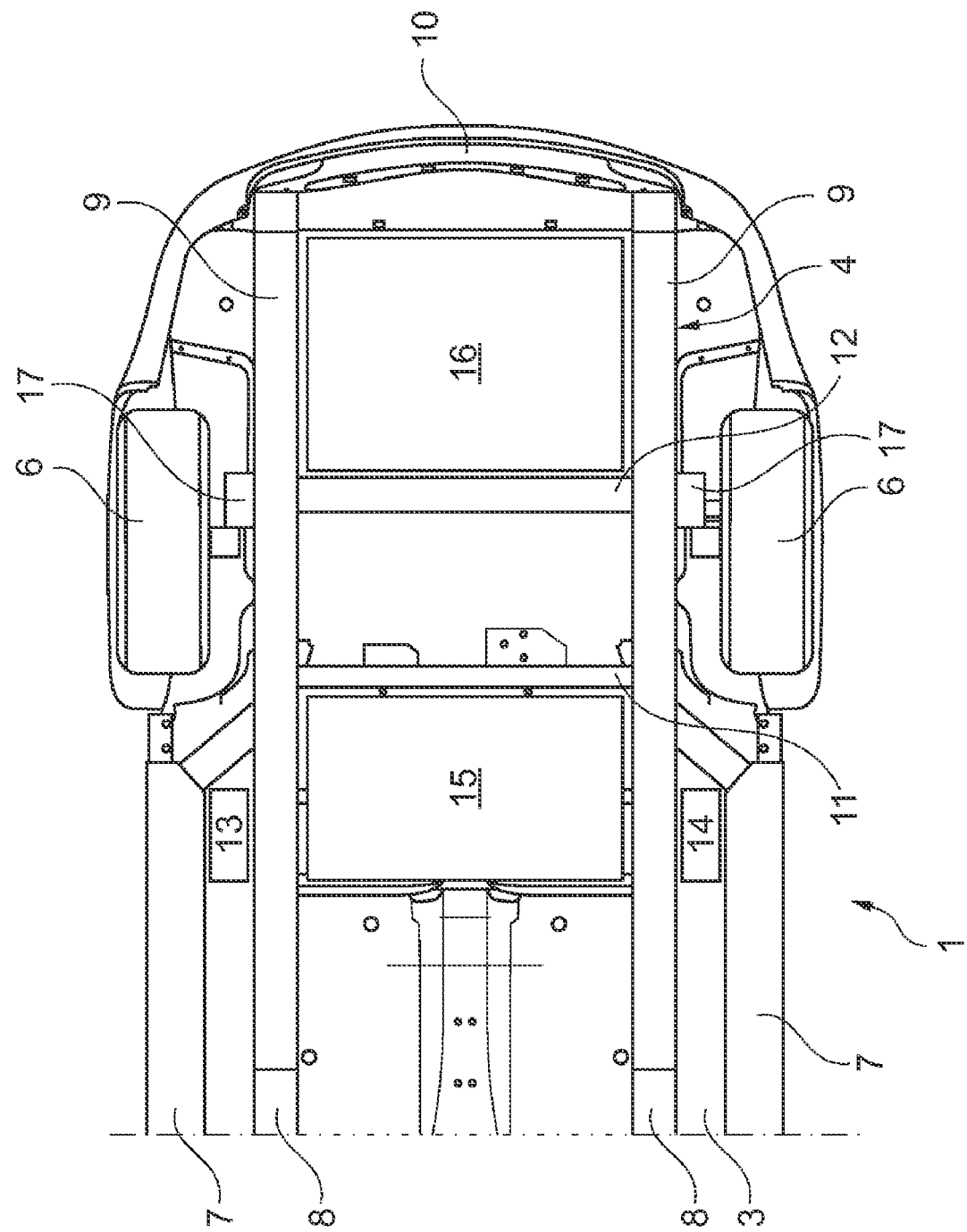
FIG. 2 shows a bottom view of the rear section of the car body according to FIG. 1.

FIG. 2 shows a bottom view of the section of the motor vehicle that features the rear frame structure 4. According to this figure, the bottom plate 3 features outer and inner longitudinal beams 7, 8 on each vehicle side. The rear frame structure 4 features longitudinal beams 9 that divide into the longitudinal beams 7, 8 of the bottom plate 3. The longitudinal beams 9 of the rear frame structure 4 extend up to a rear bumper 10. The rear frame structure 4 thusly supports the rear bumper 10. A crossbeam 11 connects the longitudinal beams 9 of the rear frame structure 4. The rear frame structure 4 also carries a rear axle 12 for guiding the rear wheels 6 of the motor vehicle. Furthermore, several mountings 13-16 for a not shown fuel tank or a not-shown electric accumulator are arranged on the rear frame structure 4. The mountings 13-16 are realized in a trough-shaped fashion and fixed on the longitudinal beams 9 of the rear frame structure 4. The rear frame structure 4 also carries a spring/damping unit 17 for the rear wheels 6. The rear frame structure 4 is manufactured of light metal or composite material and bonded to the bottom plate 3 that consists of sheet steel. The connection between the rear frame structure 4 and the bottom plate 3 naturally may also feature not-shown screw joints.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

The invention claimed is:

1. A car body for a motor vehicle, comprising:
a bottom plate that forms a lower end of a passenger compartment of the motor vehicle;
a rear frame structure extending over the bottom plate and fixed on the bottom plate, the rear frame structure including longitudinal beams that divide into an outer longitudinal beam and an inner longitudinal beam at the bottom plate;
a rear axle supported by the rear frame structure; and
at least one mounting coupled to the longitudinal beams of the rear frame structure that receives a fuel tank to couple the fuel tank to the rear frame structure.

2. The car body according to claim 1, wherein the rear frame structure supports a rear bumper of the motor vehicle.

3. The car body according to claim 1, wherein the rear frame structure carries a damping unit configured to support rear wheels of the motor vehicle.

4. The car body according to claim 3, wherein the damping unit includes a spring.

5. The car body according to claim 1, wherein the rear frame structure, the rear axle and the fuel tank form a pre-assembled structural unit.

6. The car body according to claim 1, wherein the rear frame structure comprises a crossbeam arranged transversely to a driving direction between the rear axle and the mounting for the fuel tank.

7. The car body according to claim 1, wherein the bottom plate comprises a first material and the rear frame structure comprises a second material that is different from the first material.

8. The car body according to claim 1, wherein the rear frame structure comprises a light metal.

9. The car body according to claim 1, wherein the rear frame structure comprises a composite material.

10. The car body according to claim 1, wherein the rear frame structure is bonded to the bottom plate.

11. A car body for a motor vehicle, comprising:
a bottom plate that forms a lower end of a passenger compartment of the motor vehicle;
a rear frame structure extending over the bottom plate and fixed on the bottom plate, the rear frame structure including longitudinal beams that divide into an outer longitudinal beam and an inner longitudinal beam at the bottom plate;
a rear axle supported by the rear frame structure; and
at least one mounting coupled to the longitudinal beams of the rear frame structure that receives an electric accumulator to couple the electric accumulator to the rear frame structure.

12. The car body according to claim 11, wherein the rear frame structure supports a rear bumper of the motor vehicle.

13. The car body according to claim 11, wherein the rear frame structure carries a damping unit configured to support rear wheels of the motor vehicle.

14. The car body according to claim 13, wherein the damping unit includes a spring.

15. The car body according to claim 11, wherein the rear frame structure, the rear axle and the electric accumulator form a pre-assembled structural unit.

16. The car body according to claim 11, wherein the rear frame structure comprises a crossbeam arranged transversely to a driving direction between the rear axle and the mounting for the electric accumulator.

17. The car body according to claim 11, wherein the bottom plate comprises a first material and the rear frame structure comprises a second material that is different from the first material.

18. The car body according to claim 11, wherein the rear frame structure comprises a light metal.

19. The car body according to claim 11, wherein the rear frame structure comprises a composite material.

20. The car body according to claim 11, wherein the rear frame structure is bonded to the bottom plate.

* * * * *